May 23, 1967 B. A. BUSS 3,321,172
LAUNDRY MACHINE DUMP VALVE
Filed Nov. 9, 1962
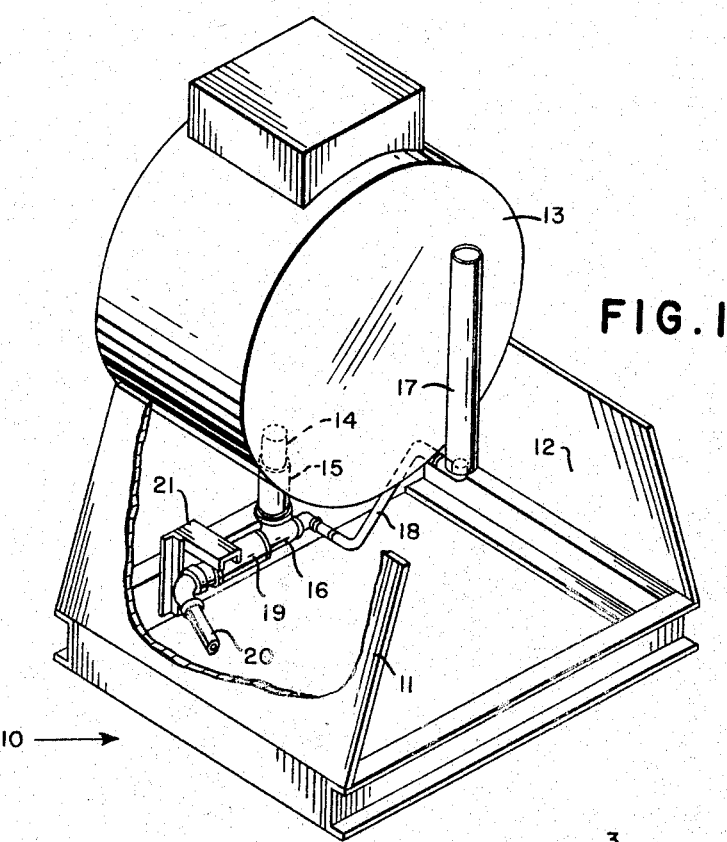
FIG. 1
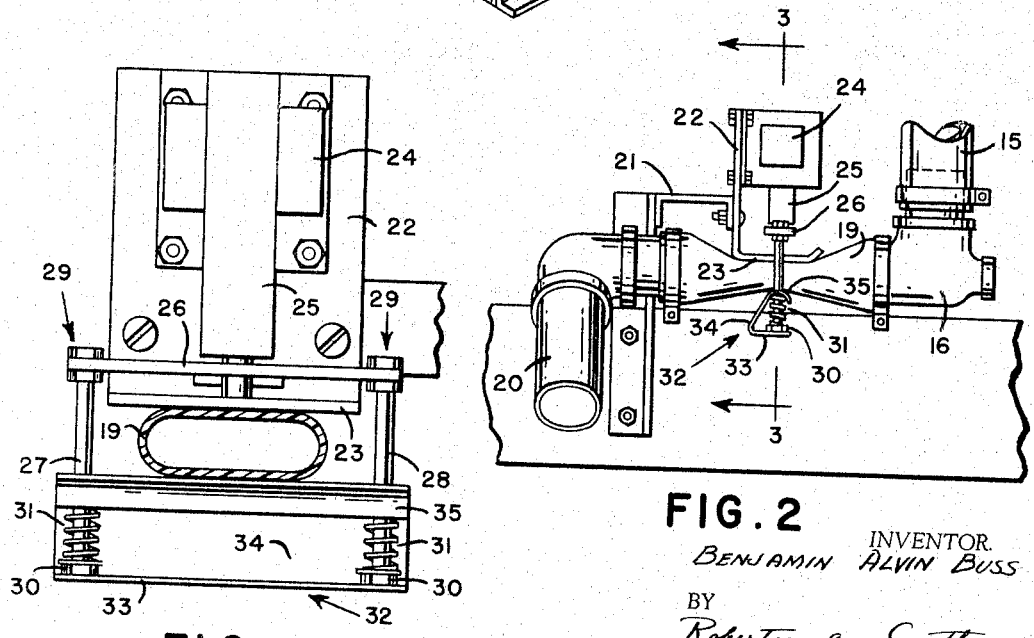
FIG. 2
FIG. 3
INVENTOR.
BENJAMIN ALVIN BUSS
BY
Robertson & Smythe
ATTORNEYS

United States Patent Office 3,321,172
Patented May 23, 1967

3,321,172
LAUNDRY MACHINE DUMP VALVE
Benjamin Alvin Buss, East Moline, Ill., assignor to Ametek, Inc., New York, N.Y., a corporation of Delaware
Filed Nov. 9, 1962, Ser. No. 236,643
2 Claims. (Cl. 251—7)

This invention relates to washer-extractors, and particularly to an improved washer-extractor having a solenoid operated dump valve.

The principal object of the invention is to provide a washer-extractor having an outlet drain including a section of flexible tubing adapted to be collapsed by a solenoid.

Another object of the invention is to provide such a washer-extractor in which the flexible tubing is collapsed by a solenoid operated member having a degree of overtravel to ensure complete cutoff of water through the flexible tubing.

Still another object of the invention is to provide such a washer-extractor in which a simple, inexpensive dump valve is provided that requires substantially no maintenance.

In one aspect of the invention, the housing for a washer-extractor may include a drain outlet connected to a duct, a portion of which may comprise a section of flexible tubing.

In another aspect of the invention, an anvil member may be located in a position in contact with the flexible tubing. The anvil member may support a solenoid, the armature of which is connected to a resiliently mounted shoe member diametrically opposite the engagement between the anvil and flexible tubing.

In still another aspect of the invention, the armature of the solenoid may be connected to a plate that straddles the flexible tubing and which extends beyond the anvil member, supporting at its opposite ends parallel rods that extend transversely of and beyond the extremity of the section of flexible tubing.

In a still further aspect of the invention, the parallel rods may pass through openings in a sheet metal jaw member extending transversely across the flexible tubing on the side thereof opposite that of the anvil member. The jaw member may be formed in an acute angle with the edge adapted to contact the flexible tubing being curved to provide a surface that will not cut the tubing when it makes contact with the tubing under pressure.

In still another aspect of the invention, springs may surround the rods between the acute angular portions thereof, and may be arranged to engage the inwardly facing surfaces of the acute angular jaw member when the jaw is in its ineffective position.

The construction and arrangement of the parts are such that upon energizing the solenoid, the jaw is moved toward the anvil, forcing the flexible tubing into a collapsed condition, thereby stopping the flow of water from the extractor housing. The spring arrangement provides a degree of overtravel of the solenoid armature to ensure complete cutoff of the water from the extractor housing.

Upon de-energizing the solenoid, the weight of the armature, jaw, rods and springs effects the movement of the jaw away from the anvil member, permitting the opening of the flexible tubing, thereby permitting the flow of water from the extractor housing therethrough.

The above, other objects and novel features of the invention will become apparent from the following specification and accompanying drawing which is merely exemplary.

In the drawing:

FIG. 1 is a perspective view of an extractor housing to which the principles of the invention have been applied;

FIG. 2 is an enlarged view of parts of the apparatus shown in FIG. 1 to which the principles of the invention have been applied; and FIG. 3 is a sectional view taken substantially along line 3—3 of FIG. 2.

Referring to the drawing, the principles of the invention have been shown as applied to a washer-extractor housing including a base 10 to which may be attached upright plates 11, 12 for supporting a housing 13, which in the embodiment disclosed is shown as a hollow cylindrical drum. The drum 13 is adapted to support a rotatable basket (not shown) therein and may include the usual openable door for the insertion of articles to be laundered.

The housing or drum 13 may include an outlet 14 opening into a duct 15 that in turn connects to a T-connection 16. One of the ends of the T may be connected to a float tank 17 through a line 18. The opposite end of T-connection 16 may be connected to a section 19 of flexible tubing that leads to a drain line 20.

Referring to FIG. 2, a bracket 21 may be stationarily mounted on the base 10 and it may support an angle member 22 having a vertical portion and a horizontal anvil portion 23. The horizontal anvil portion 23 may lie in contact with, and extend transversely across, the tubing 19. The vertical portion may support a solenoid 24 having an armature 25. The armature 25 may be connected to a plate 26 that extends transversely across tubing 19, parallel with anvil 23 and beyond the extremity of the latter.

At the ends of plate 26, depending rods 27, 28 may be rigidly attached by lock nut means 29. The rods 27, 28 may have nuts 30 at their lower ends which support springs 31 on the rods 27, 28. A jaw 32 may comprise a sheet metal member bent into an acute angle forming portions 33 and 34. The portion 34 may be curved at its upper end 35 for engagement with tubing 19 in opposed relation to the anvil 23. The end 35 may be provided with holes therein so that during assembly, rods 27, 28 may be located in the holes prior to mounting springs 31 and nuts 30 on the rods 27, 28.

The construction and arrangement of the parts are such that upon energizing the solenoid 24, the armature 25 rises, pulling plate 26 and jaw 32 upwardly so that the upper curved portion 35 thereof collapses tubing 19 against anvil 23. Overtravel of the armature is permitted by compressing springs 31 to ensure complete shutoff of tubing 19. When solenoid 24 is de-energized, armature 25, plate 26, rods 27, 28, and jaw 32 move downwardly, permitting the opening of tubing 19 for the passage of water therethrough.

Although the various features of the washer-extractor and solenoid operated dump valve have been shown and described in detail to fully disclose one embodiment of the invention, it will be evident that changes may be made in such details and certain features may be used without others without departing from the principles of the invention.

What is claimed is:

1. In a dump valve for the drain line of a washer-extractor, a section of flexible tubing; a fixed anvil member carried by a support member and arranged transversely of and in contact with said tubing; a solenoid mounted on said anvil member and including an armature; a plate connected to said armature for movement therewith and extending in parallel relation to said anvil member and beyond its extremities; parallel rods connected to said plate for movement therewith and straddling said tubing; a jaw slidably mounted on said rods and adapted to contact said tubing at a point opposite the contact between said tubing and anvil member; and resilient means between the ends of said rods and jaw for allowing overtravel of said armature to ensure said jaw completely collapsing said tubing and holding it resiliently against said anvil member when said solenoid is energized.

2. In a dump valve for the drain line of a washer-extractor, a section of flexible tubing; a fixed anvil member carried by a support member and arranged transversely of and in contact with said tubing; a solenoid mounted on said anvil member and including an armature; a plate connected to said armature for movement therewith and extending in parallel relation to said anvil member and beyond its extremities; parallel rods connected to said plate for movement therewith and straddling said tubing; a jaw slidably mounted on said rods and adapted to contact said tubing at a point opposite the contact between said tubing and anvil member, said jaw including a curved portion which lies in contact with said tubing; and resilient means between said curved portion and the ends of said rods for facilitating overtravel of said armature to ensure said jaw completely collapsing said tubing and holding it resiliently against said anvil member when said solenoid is energized.

References Cited by the Examiner
UNITED STATES PATENTS

| | | | |
|---|---|---|---|
| 2,377,953 | 6/1945 | Matton | 251—9 X |
| 2,576,808 | 11/1951 | Perkins | 251—7 X |
| 3,075,551 | 1/1963 | Smith | 251—7 X |

WILLIAM F. O'DEA, *Primary Examiner.*

R. GERARD, *Assistant Examiner.*